(12) United States Patent
Oden et al.

(10) Patent No.: US 7,449,693 B2
(45) Date of Patent: Nov. 11, 2008

(54) SYSTEM AND METHOD FOR RADIATION DETECTION AND IMAGING

(75) Inventors: Patrick Ian Oden, McKinney, TX (US); Jason Michael Neidrich, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 153 days.

(21) Appl. No.: 11/451,033

(22) Filed: Jun. 12, 2006

(65) Prior Publication Data

US 2007/0284531 A1    Dec. 13, 2007

(51) Int. Cl.
G01J 5/00    (2006.01)

(52) U.S. Cl. .................................. 250/338.1

(58) Field of Classification Search .............. 250/338.1
See application file for complete search history.

(56) References Cited

U.S. PATENT DOCUMENTS

| | | | | |
|---|---|---|---|---|
| 4,741,993 A | * | 5/1988 | Kano et al. | 430/536 |
| 5,521,123 A | * | 5/1996 | Komatsu et al. | 438/64 |
| 5,939,971 A | * | 8/1999 | Yong | 338/15 |
| 5,945,898 A | * | 8/1999 | Judy et al. | 335/78 |
| 5,972,108 A | * | 10/1999 | Beratan et al. | 117/84 |
| 6,094,127 A | * | 7/2000 | Yong | 338/15 |
| 6,194,727 B1 | * | 2/2001 | Lee et al. | 250/370.09 |

* cited by examiner

*Primary Examiner*—Constantine Hannaher
*Assistant Examiner*—Mark R Gaworecki
(74) *Attorney, Agent, or Firm*—Wade J. Brady, III; Frederick J. Telecky, Jr.

(57) ABSTRACT

System and method for detecting and imaging radiation. A preferred embodiment comprises a substrate with electronic circuitry to detect changes in a transduction signal, an intermediate conductive layer disposed above and electrically connected to the electronic circuitry, and a lower separation layer with a high coefficient of thermal resistance that partially separates the intermediate conductive layer from the electronic circuitry. The preferred embodiment also includes a top layer disposed above the intermediate conductive layer and an absorptive layer overlying the top layer, with the absorptive layer being electrically connected to the intermediate conductive layer. The absorptive layer produces a transduction signal that is proportional to an amount of radiation incident on the absorptive layer. The vertical fabrication of the radiation sensor allows for sensor arrays with a good fill factor, permitting the creation of sensor arrays with high resolution while maintaining low costs.

20 Claims, 5 Drawing Sheets

SYSTEM AND METHOD FOR RADIATION DETECTION AND IMAGING

TECHNICAL FIELD

The present invention relates generally to a system and a method for integrated circuits, and more particularly to a system and a method for detecting and imaging radiation.

BACKGROUND

It is possible to detect radiation, such as infrared (IR) radiation, using one of two general types of sensors. A first sensor type (photon sensor) detects the presence of the radiation by detecting the direct interaction of the radiation with the atomic lattice of the sensing material in the sensor, and a second sensor type (thermal sensor) detects the radiation by detecting a temperature change in the sensor due to the absorbed radiation. The temperature change causes a physical parameter of the sensor, such as resistance or voltage, to change and therefore can be detected by electronic circuitry.

With thermal sensors, thermal mass ($M_{TH}$) and thermal conductivity ($C_{TH}$) determine the response time of the system, where the response time is proportional to $M_{TH}/C_{TH}$. Generally, it is desired to have the greatest temperature change per unit of radiant power on the sensor, implying a sensor with a small thermal mass and/or a well thermally isolated sensor. However, if the sensor is too well isolated, the heat will not dissipate fast enough, therefore extending the response time of the thermal sensor.

With reference now to FIGS. 1a and 1b, there are shown diagrams illustrating prior art implementations of thermal sensor pixels. The diagrams shown in FIGS. 1a and 1b illustrate two different prior art implementations of a single pixel in a thermal sensor array. The diagram shown in FIG. 1a illustrates a single pixel 100 used in the thermal sensor array. The pixel 100 includes a detector (or absorber) 105 that includes a pair of legs 110 that elevates the detector 105 from the remainder of the thermal sensor array to thermally isolate the detector 105 from other detectors in the thermal sensor array. Conductors 115 and 120 couple the detector 105 to electronic circuitry and permit the detection of changes in physical parameters, such as resistance and voltage.

The diagram shown in FIG. 1b illustrates a single pixel 150 used in a thermal sensor array. The pixel 150 includes a detector 155 that is coupled to a rim 160 via serpentines 165. The use of the serpentines 165 yields a high coefficient of thermal resistivity due to the small cross-section of the serpentines 165, which provides electrical connectivity while minimizing thermal transfer. The pixel 150 can be created using a bulk etching process, allowing for mass production of thermal sensor arrays.

One disadvantage of the prior art is that the design of the pixels, although yielding good thermal performance, has a poor fill factor for the thermal sensor array due to the underlying support structure of the pixels, such as the legs 110, the rim 160, and the serpentines 165, consuming a significant amount of integrated circuit real estate. A low fill factor results in a thermal sensor array that generally cannot be readily scaled since a thermal sensor array with a large number of pixels may be unnecessarily large.

Another disadvantage of the prior art is the design of pixels with significant thermal mass, which can increase the response time of the pixels and the thermal sensor array. This can lead to a reduction in the overall performance and responsiveness of the thermal sensor array.

SUMMARY OF THE INVENTION

These and other problems are generally solved or circumvented, and technical advantages are generally achieved, by preferred embodiments of the present invention, which provides a system and a method for detecting and imaging radiation.

In accordance with a preferred embodiment of the present invention, a radiation sensor is provided. The radiation sensor includes a substrate with electronic circuitry to detect changes in a transduction signal, an intermediate conductive layer above and electrically connected to the electronic circuitry, and a lower separation layer with a high coefficient of thermal resistance partially separating the intermediate conductive layer from the electronic circuitry. The radiation sensor also includes a top layer above the intermediate conductive layer and an absorptive layer over the top layer and electrically connected to the intermediate conductive layer. The absorptive layer produces the transduction signal that is proportional to an amount of radiation incident on the absorptive layer.

In accordance with another preferred embodiment of the present invention, a micro electromechanical system is provided. The micro electromechanical system includes a substrate including electronic circuitry to detect changes in transduction signals and an array of radiation sensors. Each radiation sensor includes an intermediate conductive layer above and electrically connected to the electronic circuitry, and a lower separation layer with a high coefficient of thermal resistance partially separating the intermediate conductive layer from the electronic circuitry. Each radiation sensor also includes a top layer above the intermediate conductive layer and an absorptive layer over the top layer and electrically connected to the intermediate conductive layer. The absorptive layer produces the transduction signal that is proportional to an amount of radiation incident on the absorptive layer.

In accordance with another preferred embodiment of the present invention, a method for forming a thermal sensor is provided. The method includes depositing an insulating a layer over a substrate, and opening contacts in the insulating layer. The method also includes forming a first spacer layer, forming an intermediate conductive layer over the first spacer layer and electrically connected to the substrate, and forming a second spacer layer over the intermediate conductive layer. The method further includes forming a top layer over the second spacer layer, depositing a radiation absorptive layer over the top layer and electrically connected to the intermediate conductive layer, and removing the first spacer layer and the second spacer layer.

An advantage of a preferred embodiment of the present invention is that a thermal sensor array can be created with low thermal mass, which can improve the response time of the thermal sensor array. The improved response time can yield better radiation detection and imaging performance.

A further advantage of a preferred embodiment of the present invention is that a thermal sensor array can be created with a high fill factor. The thermal sensor array with a high fill factor can have a better signal-to-noise ratio than thermal sensor arrays with a low fill factor.

Yet another advantage of a preferred embodiment of the present invention is that the manufacture of the thermal sensor array can be performed using existing manufacturing technology, therefore, the manufacture of the thermal sensor arrays can be achieved with a small investment in fabrication facilities.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a high fill factor thermal sensor array with a low thermal mass and fast response time. The size of each thermal sensor pixel in the thermal sensor array can be scaled without incurring dramatic increases in cost or manufacturing difficulty. These thermal sensor arrays may be referred to as micro electromechanical systems.

Figure 2A:
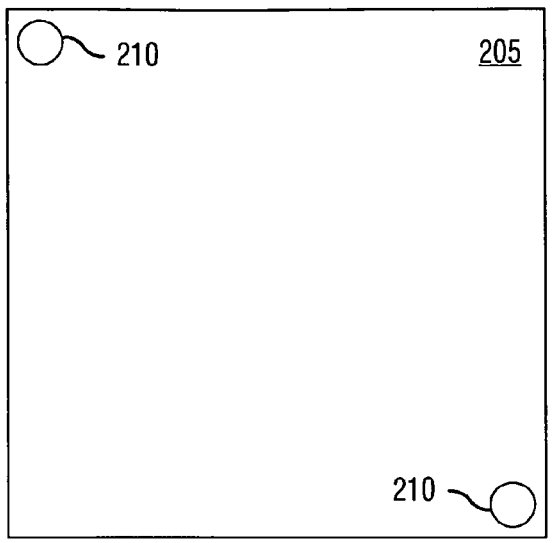
FIGS. 2a through 2d are diagrams of different views of a pixel of a thermal sensor array, according to a preferred embodiment of the present invention.

With reference now to FIGS. 2a through 2d, there are shown diagrams illustrating a cross-sectional view of a single pixel of a thermal sensor array and top views of different layers of the single pixel, according to a preferred embodiment of the present invention. The diagram shown in FIG. 2a illustrates a first layer 205 of a single pixel of a thermal sensor array. The first layer 205 comprises a blanket oxide layer that can be used to cover a substrate (not shown in FIG. 2a) that includes necessary electronics to detect changes in transduction signals, such as changes in resistance or voltage. The first layer 205 can include vias 210 to allow for electrical contact with electrodes in the substrate underneath the first layer 205. According to a preferred embodiment of the present invention, at least two vias 210 are needed in the first layer 205.

Figure 2C:
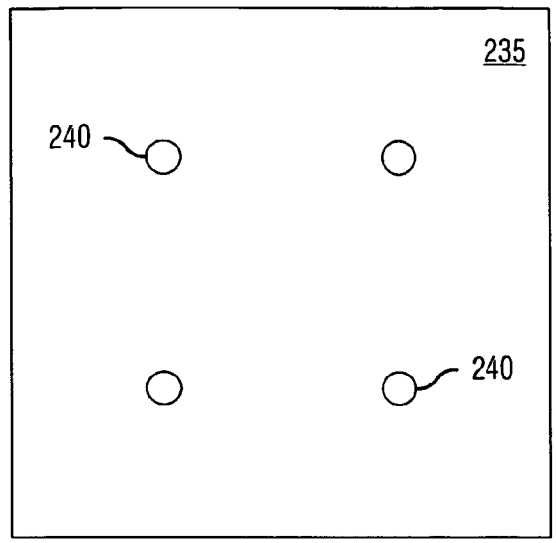
Figure 2B:
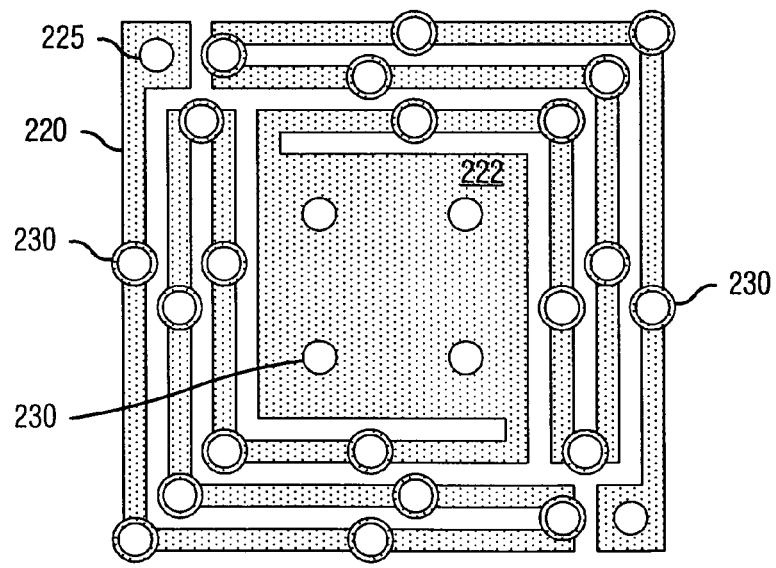

The diagram shown in FIG. 2b illustrates a second layer 215. The second layer 215 can be a metallic structure that is formed from aluminum or an alloy of aluminum, for example. Additionally, other materials that have an appreciable coefficient of thermal resistivity, such as vanadium oxide (VOx) can be used to form the second layer 215. The second layer 215 is separated from the first layer 205 by a layer of vacuum, air, or some other type of gas, with the vacuum, air, or gas providing thermal isolation for the second layer 215. The second layer 215 comprises a serpentine 220 and a center mass 222. The serpentine 220 and the center mass 222 can be electrically connected to the electronics in the substrate with vias 225, while anchor vias 230 physically connect the serpentine 220 and the center mass 222 to the first layer 205 (the oxide layer). The serpentines 220 electrically couple the center mass 222 to the electronics in the substrate, with the long circuitous routing of the serpentines 220 providing a measure of thermal isolation. Although shown in FIG. 2b as being located in approximately the center of the second layer 215, the center mass 222 may actually be located at other parts of the second layer 215.

The diagram shown in FIG. 2c illustrates a third layer 235. The third layer 235 can be a metallic structure or a multilayer stack formed from a metal and some other material. The metallic structure or the multilayer stack can be formed over the second layer 215 and is separated from the second layer 215 by a layer of vacuum, air, or some other type of gas. Again, the layer of vacuum, air, or gas provides thermal isolation from the second layer 215. Alternatively, the third layer 235 can be formed from a non-metallic material, with the only requirement being that the material used being capable of thermally conductive. The third layer 235 includes vias 240 that permit the connection of the third layer 235 to the second layer 215. The third layer 235 can then be covered by a radiation (for example, infrared radiation) absorbing material. Alternatively, the multilayer stack forming the third layer 235 can include a layer of the radiation absorbing material, typically on a top layer.

Figure 2D:
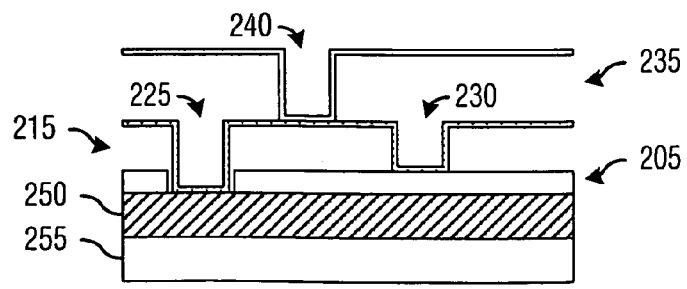
Figure 3A:
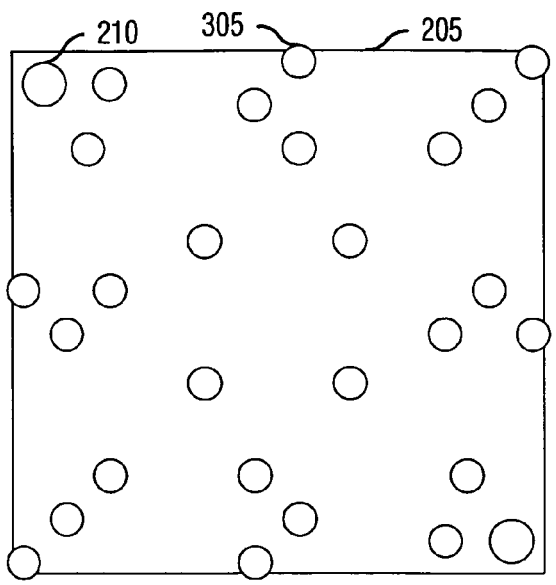
FIGS. 3a through 3d are diagrams of different views of a pixel of a thermal sensor array, according to a preferred embodiment of the present invention.
Figure 3C:
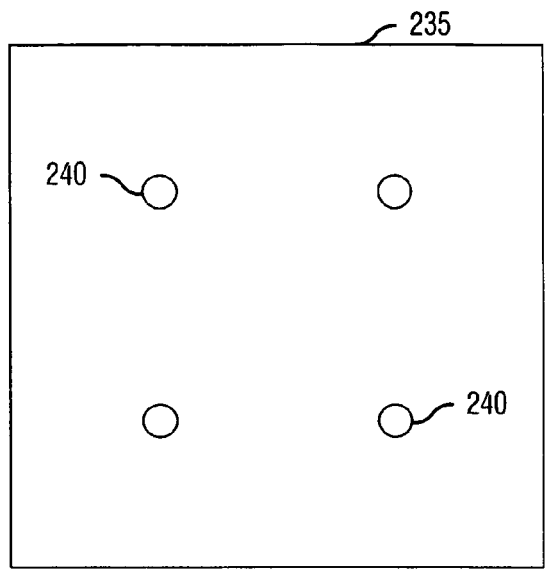
Figure 3B:
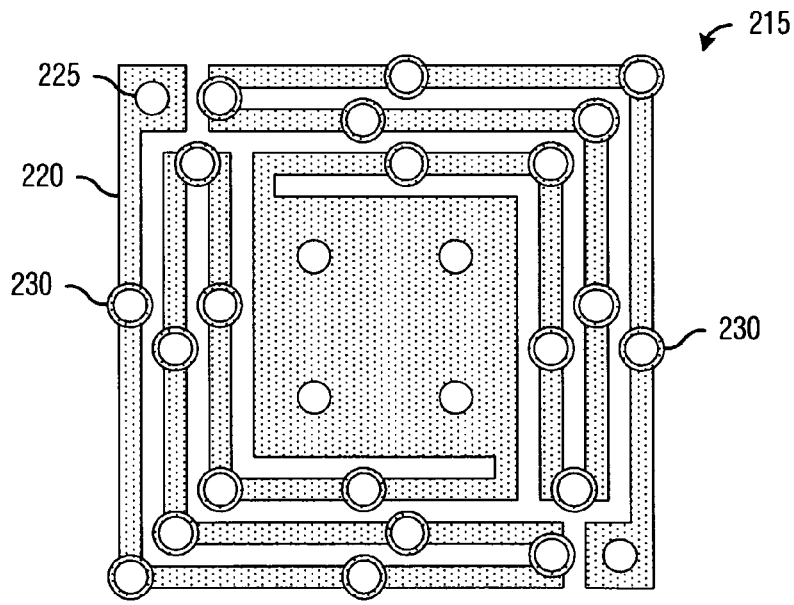
Figure 3D:
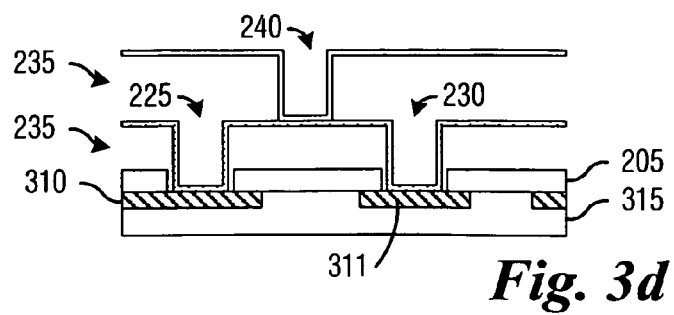

The diagram shown in FIG. 2d illustrates a cross-sectional view of a portion of the single pixel of the thermal sensor array. The single pixel of the thermal sensor array includes the first layer 205 formed over electronics, which can include a metal contact 250, that will permit electrical connectivity of the first layer 215 to the electronics by way of the via 225. The metal contact 250 may be formed over a substrate 255. The second layer 215 may also be connected to the first layer 205 by the anchor via 230. The connection between the second layer 215 and the metal contact 250 by the via 225 can be electrical in nature, while the connection between the second layer 215 and the first layer 205 by the via 230 is a physical connection. The third layer 235 can be connected to the second layer by the via 240. Also shown in the diagram are the layers of vacuum, air, or some other type of gas separating the second layer 215 from the first layer 205 and the third layer 235 from the second layer 215.

With reference now to FIGS. 3a through 3d, there are shown diagrams illustrating a cross-sectional view of a single pixel of a thermal sensor array and top views of different layers of the single pixel, according to a preferred embodiment of the present invention. The diagrams shown in FIGS. 3a through 3d illustrate an alternate embodiment of the present invention, wherein the first layer 205 includes vias 305 that allow vias 230 in the second layer 215 to make contact with metal contacts 310 and 311 present in the substrate 315. According to a preferred embodiment of the present invention, the metal contacts 310 can be used to provide electrical connectivity, while metal contacts 311 are electrically isolated, functioning only to provide a solid physical connection. The connection offered by the vias 230 and the vias 305 to the metal contacts in the substrate provides a strong physical connection between the second layer 215 and the substrate 315. Furthermore, the connection to the substrate 315 can allow for better thermal conductivity and therefore a shorter sensor response time.

Figure 1A:
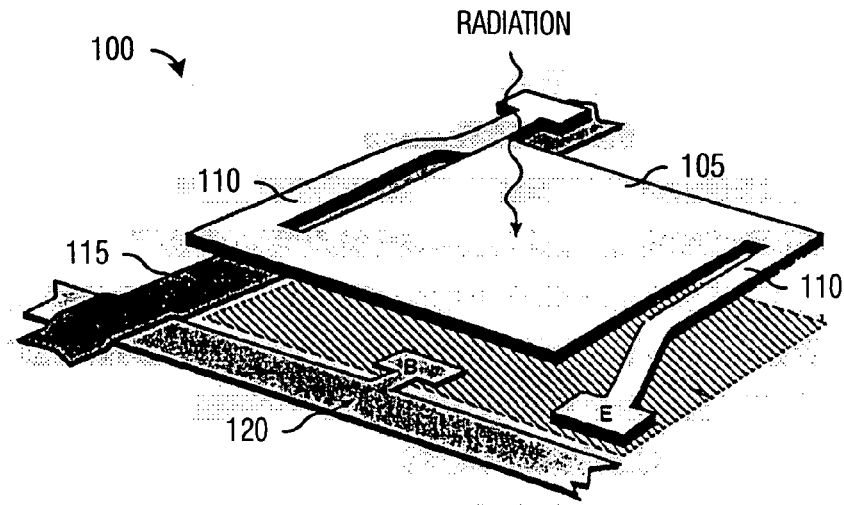
FIGS. 1a and 1b are diagrams of prior art thermal sensor pixels.
Figure 1B:
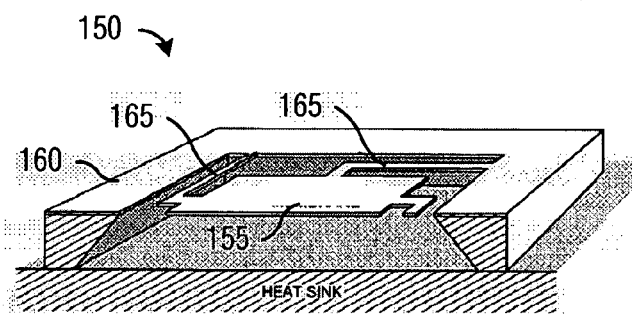
Figure 4:
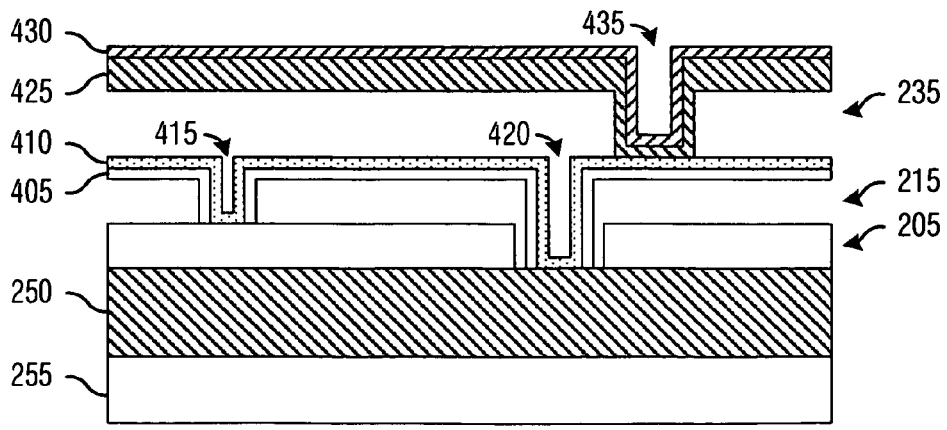
FIG. 4 is a diagram of a pixel of a thermal sensor array, according to a preferred embodiment of the present invention.

With reference now to FIG. 4, there is shown a diagram illustrating a cross-sectional view of a single pixel of a thermal sensor array, according to a preferred embodiment of the present invention. The diagram illustrates a cross-sectional view of an alternate embodiment of a single pixel of a thermal sensor array, wherein the second layer 215 is a multi-layer stack, with a first stack layer 405 formed from an oxide and a second stack layer 410 formed from a material with a large coefficient of thermal resistance, such as vanadium oxide (VOx), aluminum (Al), silver (Ag), copper (Cu), gold (Au), platinum (Pt), as well as semiconductors and semiconductor alloys, such as silicon germanium (SiGe), protein thin films, such as cytochrom C, and so forth. Vias 415 and 420 in the second layer 215 can be specially formed so that the portion of the first stack layer 405 at the bottom of the vias 415 and 420 are removed (such as by etching) so that the second stack layer 410 can make physical contact with the first layer 205 (via 415) or the metal contact 250 (via 420). The contact between the second stack layer 410 and the first layer 205 and the metal contact 250 permitted by the vias 415 and 420 affords an increase in the thermal isolation characteristics of the thermal sensor array.

The third layer 235 can also be a multi-layer stack, with a first stack layer 425 formed from a metallic material, such as aluminum or an alloy of aluminum, and a second stack layer 430 formed from a radiation absorbing material, such as mesoporous metals, an optical interference stack, and so forth. Vias, such as via 435, permit the third layer 235 to attach to the second layer 215. The connection between the third layer 235 and the second layer 215 provided by the via 435 can be both a physical connection and an electrical connection.

According to a preferred embodiment of the present invention, the second stack layer 430 (or a top portion of a single layered third layer) can be formed using deposition techniques in a partial pressure of an inert gas, such as argon. The presence of argon can diminish the atomistic kinetic energy of many materials to a point where when the atoms (or molecules) of the materials strike the surface (such as the first stack layer 420 or a bottom portion of a single layered third layer), a highly roughened web-like surface is created. This roughened surface can help to decrease reflectivity in the electromagnetic band of interest, for example, IR.

Figure 5A:
FIGS. 5a through 5k are diagrams of the fabrication of a pixel of a thermal sensor array, according to a preferred embodiment of the present invention.

With reference now to FIGS. 5a through 5k, there are shown diagrams illustrating cross-sectional views of a single pixel of a thermal sensor array during the fabrication of the thermal sensor array, according to a preferred embodiment of the present invention. The diagram shown in FIG. 5a illustrates a substrate 505. The substrate 505 may already contain electronics previously fabricated, but not shown. The electronics can be used in the detection of changes in transduction signals, providing information regarding changes in resistance and voltage, for example. The substrate 505 may also include metal contacts (also not shown) that will allow electrical connectivity between the electronics already fabricated in the substrate 505 and the pixel of the thermal sensor array to be fabricated.

Figure 5B:
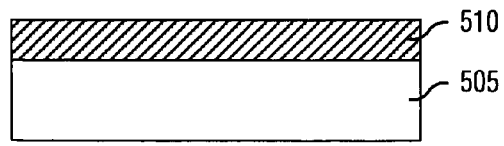
Figure 5C:
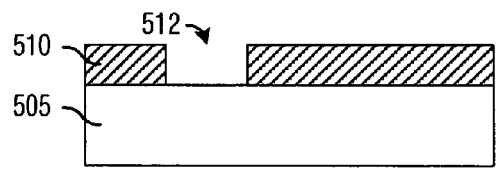

The diagram shown in FIG. 5b illustrates an oxide layer 510 deposited over the substrate 505. The oxide layer 510 can function as an electrical insulator as well as a thermal insulator. The diagram shown in FIG. 5c illustrates a via 512 formed in the oxide layer 510. After the deposition of the oxide layer 510, vias, such as the via 512, can be created in the oxide layer 510 to permit electrical connectivity and/or physical connectivity to the substrate 505. The oxide layer 510 can be etched using typical etching techniques, such as those employing a resist layer (not shown) that is patterned and then developed and followed by an etch. After the oxide layer 510 has been etched, the resist layer can be stripped.

Figure 5D:
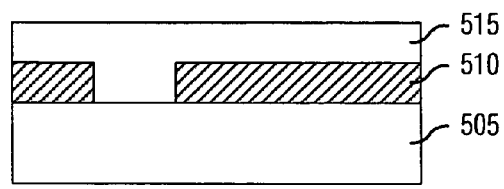
Figure 5E:
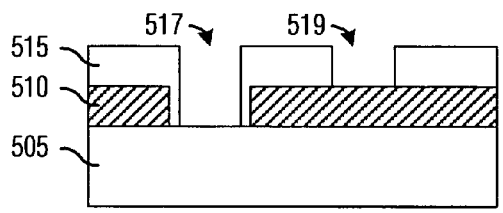

The diagram shown in FIG. 5d illustrates a resist layer 515 deposited over the oxide layer 510, using spin coat techniques, for example. The resist layer 515 can function as a spacer layer to permit the formation of elevated structures, such as the second layer 215 (FIG. 2d), for example. After the formation of the elevated structures, the resist layer 515 and other similar layers can be removed to free the elevated structures to move (for use in micro electromechanical systems (MEMS)), thermally isolate the elevated structures (for use in thermal sensors), and so forth. The resist layer 515 can also be patterned to create vias. The diagram shown in FIG. 5e illustrates vias 517 and 519 created in the resist layer 515. The patterning of the resist layer 515 can be performed using typical techniques, such as by exposing the resist layer 515 with a desired pattern and then developing the resist layer 515 to remove portions of the resist layer 515. The via 517 is located at a position so that it opens the resist layer 515 all the way to the substrate 505, while the via 519 is located so that it opens the resist layer 515 to the oxide layer 510.

Figure 5F:
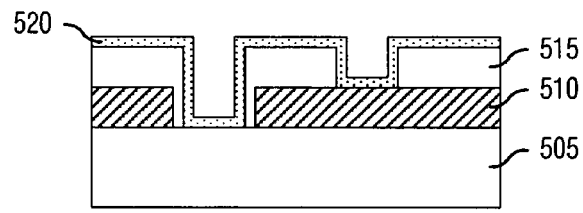

After the patterning of the resist layer 515, a middle conductor layer 520 can be deposited, shown in FIG. 5f. Deposition of the middle conductor layer 520 can be performed using standard techniques, such as sputter deposition. The middle conductor layer 520 may be formed from a metallic material such as aluminum or an alloy of aluminum. Alternatively, the middle conductor layer 520 may be a multi-layer stack (such as shown in FIG. 4, the first stack layer 405 and the second stack layer 410, for example). Although the discussion focuses on the middle conduction layer 520 being formed from a metallic material, other materials can be used, such as oxides, materials with large coefficients of thermal resistivity (for example, vanadium oxide), and so forth.

Figure 5G:
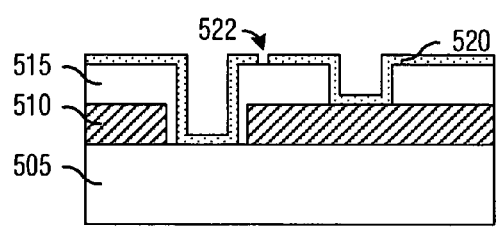
Figure 5H:
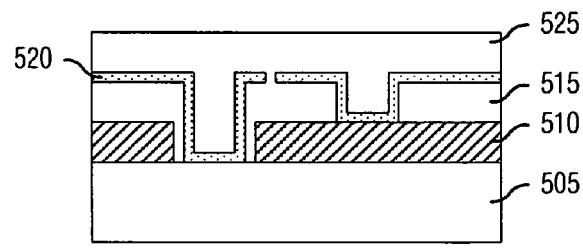

The middle conductor layer 520 can then be patterned, to create an opening or a serpentine pattern (such as the serpentine 220 (FIG. 2b)), as shown in FIG. 5g. For example, an opening 522 can be patterned into the middle conductor layer 520. The patterning of the middle conductor layer 520 can be performed using typical methods, such as with the use of a resist layer that can be patterned and then developed, followed by an etching of the middle conductor layer 520 and then a strip of the resist layer. After the patterning of the middle conductor layer 520, a second resist layer 525 can be deposited (as shown in FIG. 5h). The second resist layer 525 can be functionally equivalent to the resist layer 515 and permit the formation of elevated structures, such as the third layer 235 (FIG. 2d), for example.

Figure 5I:
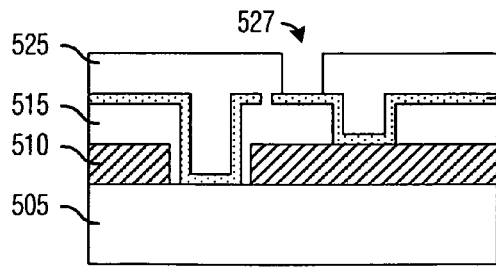
Figure 5J:
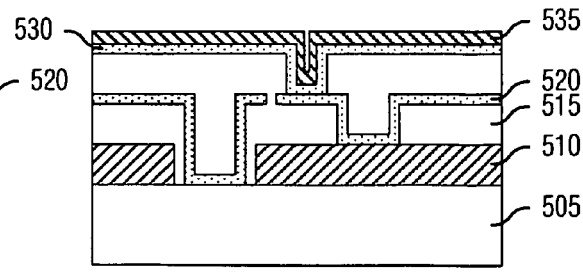
Figure 5K:
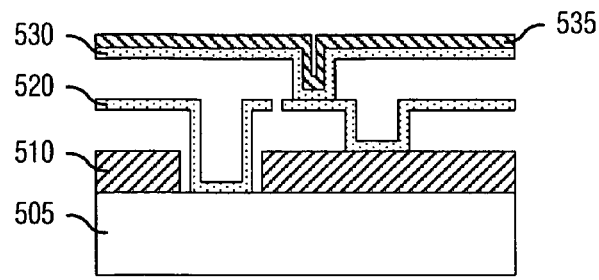

As with the resist layer 515, the second resist layer 525 can be patterned to create vias, as shown in FIG. 5i. A via 527 can be patterned into the second resist layer 525, with the patterning using typical techniques, such as exposing the second resist layer 525 with a desired pattern and then developing the second resist layer 525 to remove portions of the second resist layer 525. After the second resist layer 525 is patterned, an upper layer 530 can be formed (shown in FIG. 5j). After the formation of the upper layer 530, an absorptive layer 535 can be formed over the upper layer 530, such as by deposition techniques. Alternatively, the upper layer 530 can be formed from an absorptive material, thereby eliminating the need for a multi-layered top layer. After the fabrication of the top layer (the upper layer 530 and the absorptive layer 535 or simply the upper layer 530) is complete, the resist layer 515 and the second resist layer 525 can be removed, as shown in FIG. 5k. The removal of the resist layer 515 and the second resist layer 525 can be achieved using an isotropic etch, for example.

With reference now to FIGS. 6a through 6d, there are shown diagrams illustrating cross-sectional views of a single pixel of a thermal sensor array during the fabrication of the thermal sensor array, according to a preferred embodiment of the present invention. The diagrams shown in FIGS. 6a through 6d illustrate an alternate embodiment of the present invention, wherein the bottoms of vias are removed to help improve the coefficient of thermal resistance of the thermal sensor array. The diagrams shown in the figures can occur as a replacement or an enhancement to deposition of the middle conductor layer 520 (FIG. 5f).

Figure 6A:
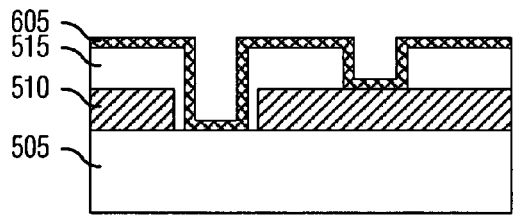
FIGS. 6a through 6d are diagrams of the fabrication of a pixel of a thermal sensor array, according to a preferred embodiment of the present invention.
Figure 6D:
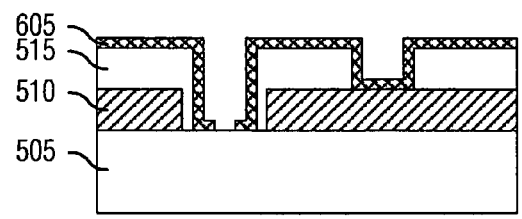
Figure 6B:
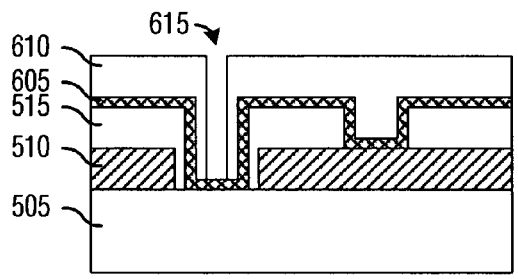
Figure 6C:
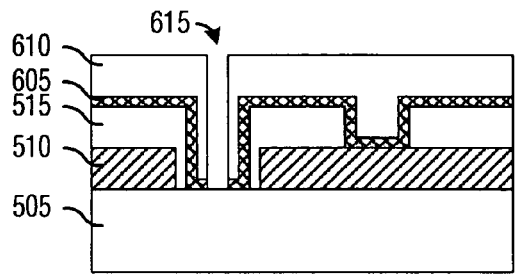

Rather than covering the resist layer 515 with a metallic material to form the middle conductor layer 520, an oxide layer 605 is used to cover the resist layer 515 (FIG. 6a), which can be followed with the formation of an auxiliary resist layer 610 (FIG. 6b), with the auxiliary resist layer 610 covering the oxide layer 605. The auxiliary resist layer 610 can be patterned and developed to create vias, such as via 615 (FIG. 6b). An etching operation can be used to remove a portion of the oxide layer 605 exposed by the via 615 in the auxiliary resist layer 610 (FIG. 6c). The removal of the portion of the oxide layer 605 exposes the substrate 505. The auxiliary resist layer 610 can then be removed (stripped) as shown in FIG. 6d and the fabrication of the thermal sensor array can then continue, with the continued fabrication of the middle conductor layer 520, such as with a deposition of a material with a high coefficient of thermal resistance.

Figure 7A:
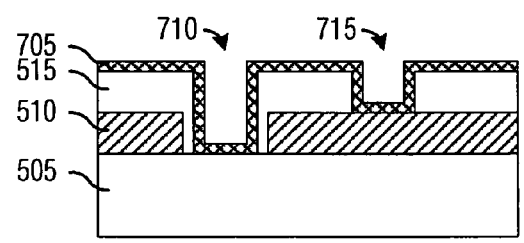
FIGS. 7a and 7b are diagrams of the fabrication of a pixel of a thermal sensor array, according to a preferred embodiment of the present invention.
Figure 7B:
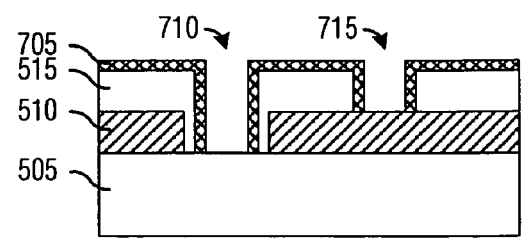

With reference now to FIGS. 7a and 7b, there are shown diagrams illustrating cross-sectional views of a single pixel of a thermal sensor array undergoing fabrication, according to a preferred embodiment of the present invention. The diagrams shown in FIGS. 7a and 7b illustrate an alternate embodiment of the present invention, wherein the bottoms of vias are removed to help improve the coefficient of thermal resistance of the thermal sensor array. The diagrams shown in the figures can occur as a replacement or an enhancement to deposition of the middle conductor layer 520 (FIG. 5f).

As discussed above, rather than covering the resist layer 515 with a metallic material to form the middle conductor layer, an oxide layer 705 can be used to cover the resist layer 515 (FIG. 7a). The oxide layer 705 follows the pattern of the resist layer 515 and can form vias 710 and 715. This can be followed with an oxide etch to clear the via bottoms and expose the substrate 505 and the oxide layer 510. The fabrication of the thermal sensor array can then continue, with the continued fabrication of the middle conductor layer 520, such as with a deposition of a material with a high coefficient of thermal resistance.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A radiation sensor comprising:
    a substrate having electronic circuitry to detect changes in a transduction signal;
    an intermediate conductive layer disposed above and electrically connected to the electronic circuitry;
    a lower separation layer having a high coefficient of thermal resistance partially separating the intermediate conductive layer from the electronic circuitry;
    a top layer disposed above the intermediate conductive layer, wherein the intermediate conductive layer comprises two thin conductive elements having thin serpentine patterns and electrically coupling the top layer to the electronic circuitry; and
    an absorptive layer overlying the top layer and electrically connected to the intermediate conductive layer, wherein the absorptive layer produces the transduction signal that is proportional to an amount of radiation incident on the absorptive layer.

2. The radiation sensor of claim 1, wherein the top layer is partially separated from the intermediate conductive layer by an upper separation layer having a high coefficient of thermal resistance.

3. The radiation sensor of claim 1, wherein the lower separation layer having a high coefficient of thermal resistance is selected from the group consisting of: air, a vacuum, a gas, and combinations thereof.

4. The radiation sensor of claim 1 further comprising an insulating layer formed between the electronic circuitry and the lower separation layer, the insulating layer having openings to permit electrical connections between the electronic circuitry and the intermediate conductive layer.

5. The radiation sensor of claim 4, wherein the insulating layer comprises an oxide.

6. The radiation sensor of claim 1, wherein the intermediate conductive layer is separated from the top layer by a second separation layer having a high coefficient of thermal resistance.

7. The radiation sensor of claim 1, wherein the intermediate conductive layer is coupled to the electronic circuitry by two electrical contacts, and wherein the intermediate conductive layer is coupled to the top layer at a mass, and wherein each of the two thin conductive elements uniquely couples a respective one of the two electrical contacts to the mass.

8. The radiation sensor of claim 1, wherein the thin conductive elements have a large coefficient of thermal resistivity.

9. The radiation sensor of claim 1, wherein the thin conductive elements comprise a material selected from the group consisting of: vanadium oxide (VOx), aluminum (Al), silver (Ag), copper (Cu), gold (Au), platinum (Pt), silicon germanium (SiGe), cytochrom C, and combinations thereof.

10. The radiation sensor of claim 1, wherein the thin conductive elements are physically anchored to an insulating layer positioned between the electronic circuitry and the intermediate conductive layer to maintain stability.

11. The radiation sensor of claim 1, wherein the intermediate conductive layer comprises:

an oxide layer;

a layer having a large coefficient of thermal resistance disposed over the oxide layer; and contact points physically connecting the intermediate conductive layer and the electronic circuitry.

12. The radiation sensor of claim 1, wherein the radiation is infrared radiation.

13. A micro electromechanical system comprising:

a substrate comprising electronic circuitry to detect changes in transduction signals; and an array of radiation sensors, each radiation sensor comprising an insulating layer disposed above the electronic circuitry;

an intermediate conductive layer disposed above the insulating layer and electrically connected to the electronic circuitry;

a lower separation layer having a high coefficient of thermal resistance partially separating the intermediate conductive layer from the electronic circuitry;

a top layer disposed above the intermediate conductive layer, wherein the intermediate conductive layer comprises two thin conductive elements having thin serpentine patterns and electrically coupling the top layer to the electronic circuitry; and an absorptive layer overlying the top layer and electrically connected to the intermediate conductive layer, wherein the absorptive layer produces one of the transduction signals that is proportional to an amount of radiation incident on the absorptive layer.

14. The micro electromechanical system of claim 13, wherein the micro electromechanical system is vacuum sealed in a package.

15. The micro electromechanical system of claim 13, wherein the electronic circuitry produces electrical signals based on radiation incident on the array of radiation sensors.

16. A method for forming a thermal sensor, the method comprising:

depositing an insulating layer over a substrate;

opening contacts in the insulating layer;

forming a first spacer layer;

forming an intermediate conductive layer comprising two thin conductive elements having thin serpentine patterns over the first spacer layer and electrically connected to the substrate;

forming a second spacer layer over the intermediate conductive layer;

forming a top layer over the second spacer layer and electrically connected to the two thin conductive elements of the intermediate conductive layer;

depositing a radiation absorptive layer over the top layer; and removing the first spacer layer and the second spacer layer.

17. The method of claim 16, wherein the forming the intermediate conductive layer comprises:

depositing the intermediate conductive layer; and patterning the intermediate conductive layer.

18. The method of claim 17, wherein the intermediate conductive layer comprises an oxide layer, and wherein the forming the intermediate conductive layer comprises etching away portions of the intermediate conductive layer to form via bottoms.

19. The method of claim 17, wherein the intermediate conductive layer comprises an oxide layer, and wherein the forming the intermediate conductive layer comprises:

depositing a resist layer;

developing the resist layer;

etching away portions of the intermediate conductive layer; and stripping the resist layer.

20. The method of claim 16, wherein the absorptive layer is formed by deposition in the presence of an inert gas.

* * * * *